Dec. 8, 1953  C. M. ZOLL  2,661,661
DUPLICATING MILLING MACHINE
Filed Sept. 21, 1951  7 Sheets-Sheet 1

INVENTOR
Carl M. Zoll,
BY
ATTORNEY

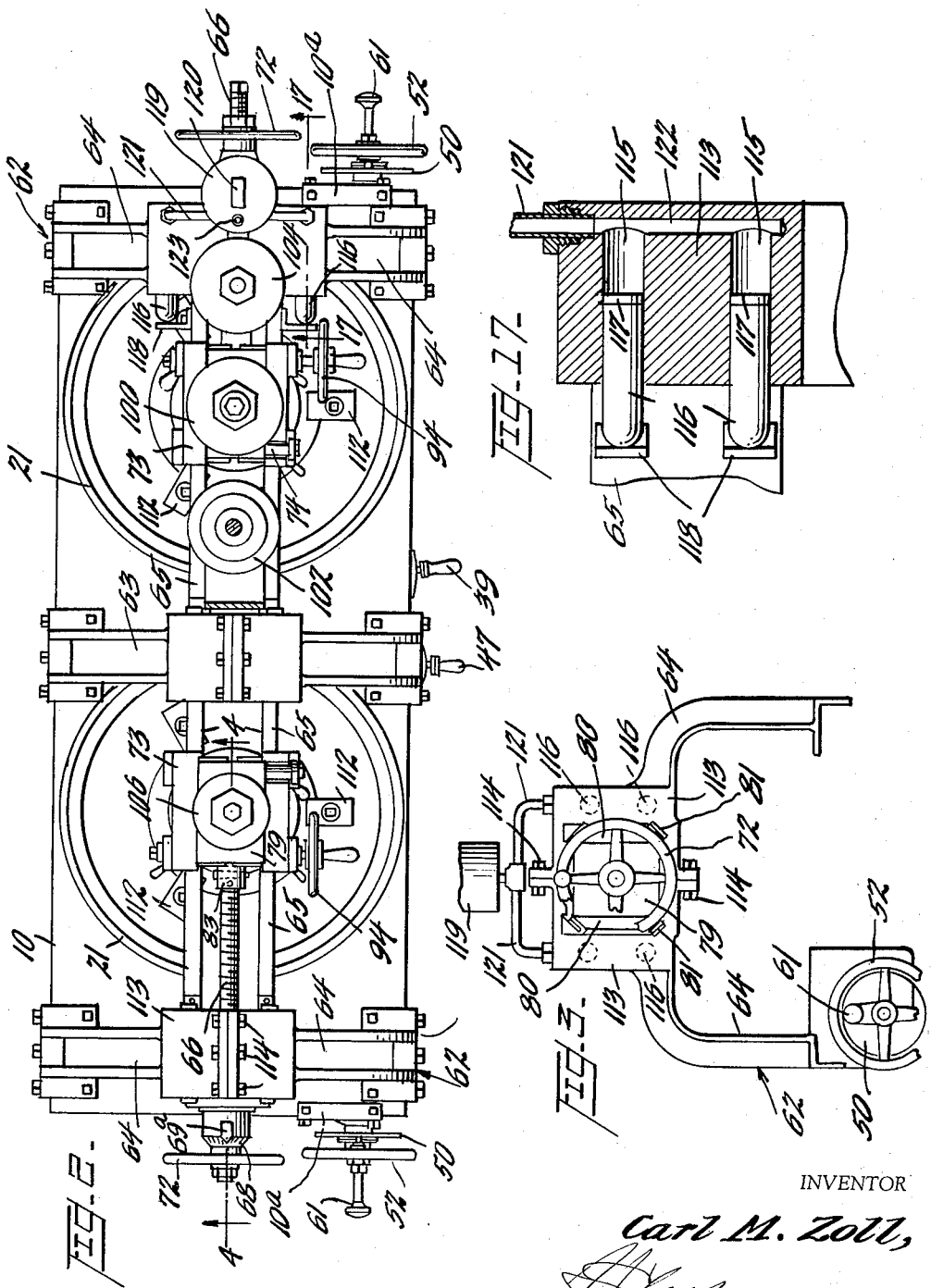

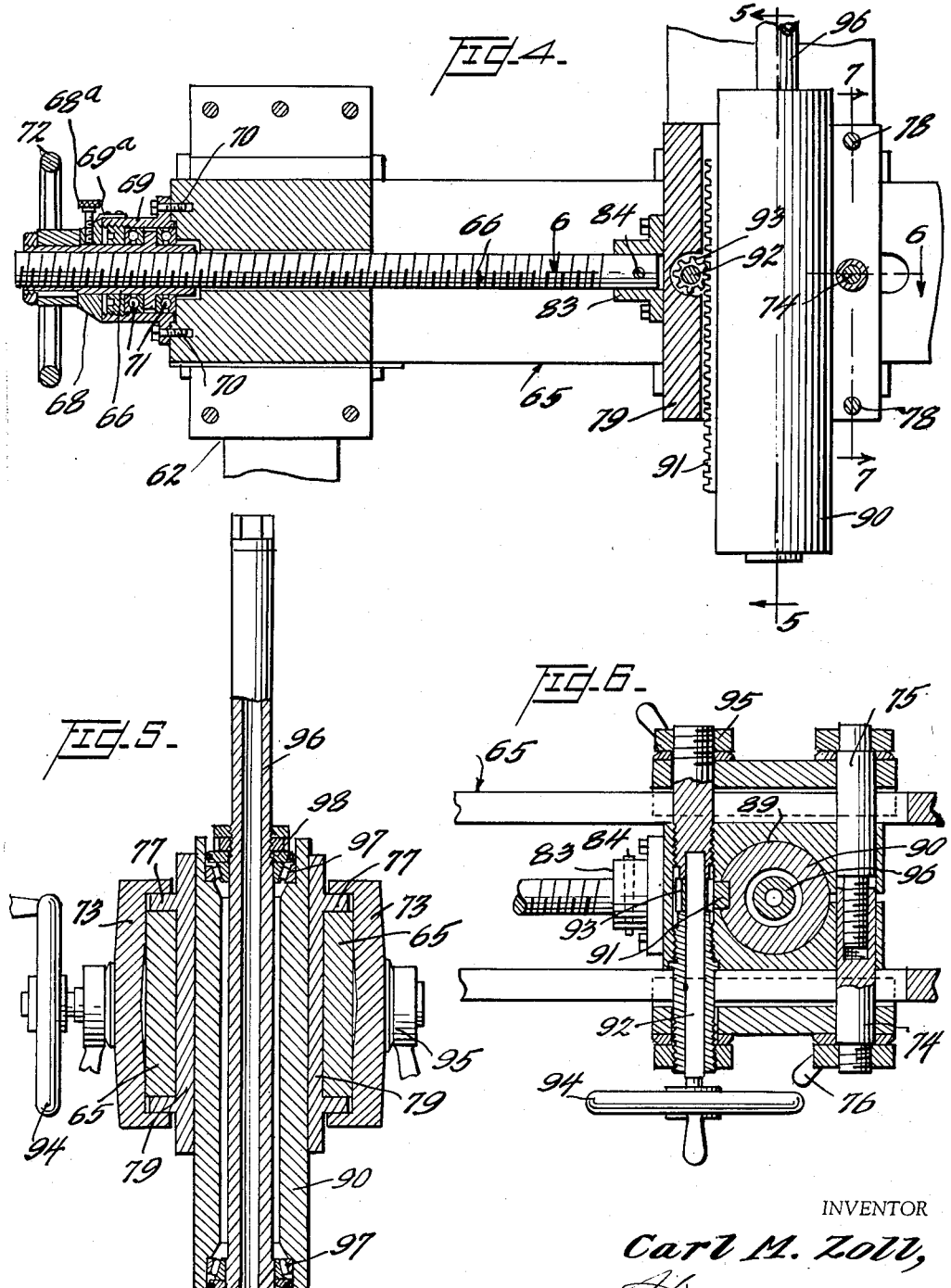

Dec. 8, 1953 C. M. ZOLL 2,661,661
DUPLICATING MILLING MACHINE
Filed Sept. 21, 1951 7 Sheets-Sheet 4
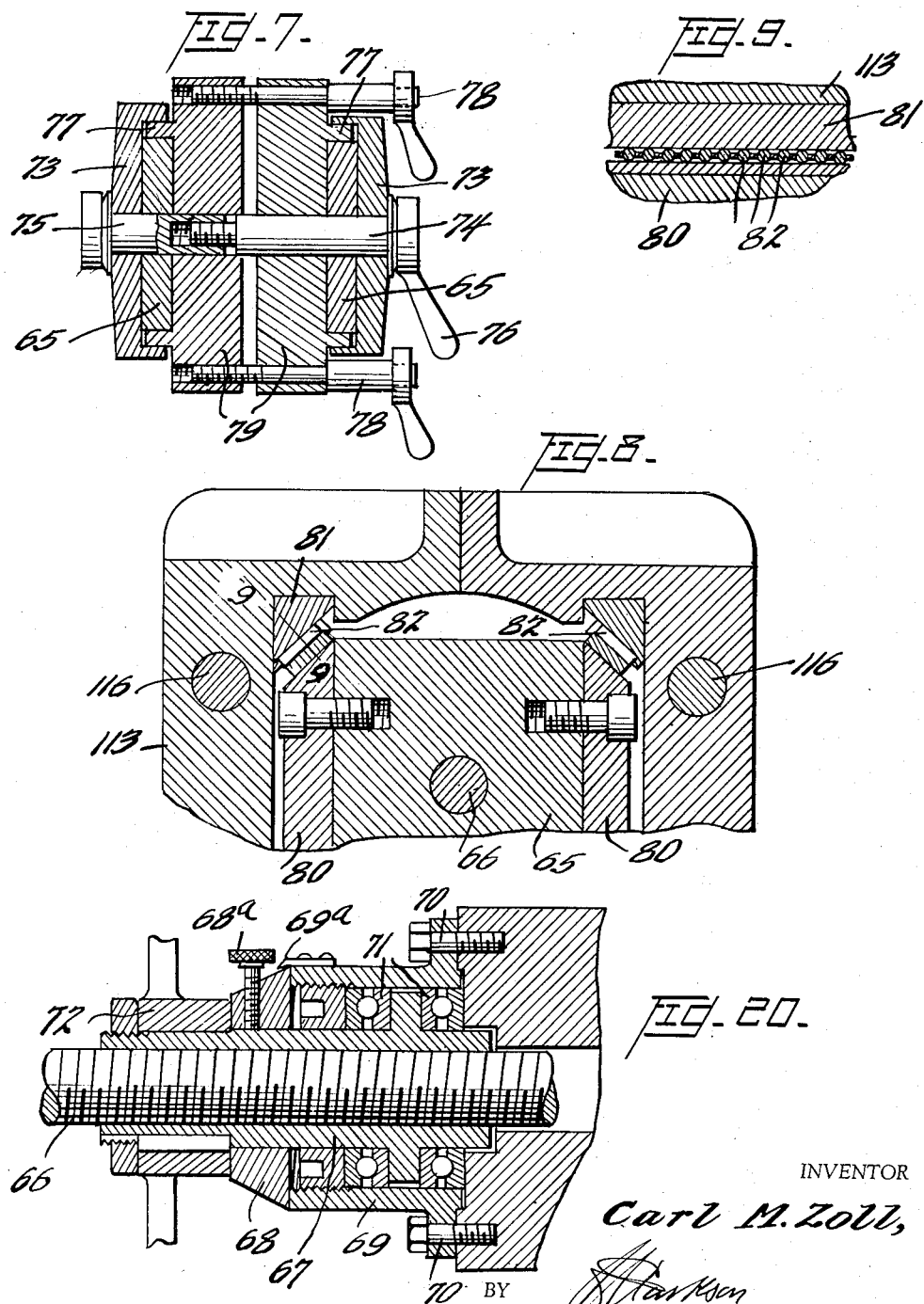
INVENTOR
Carl M. Zoll,
BY
ATTORNEY

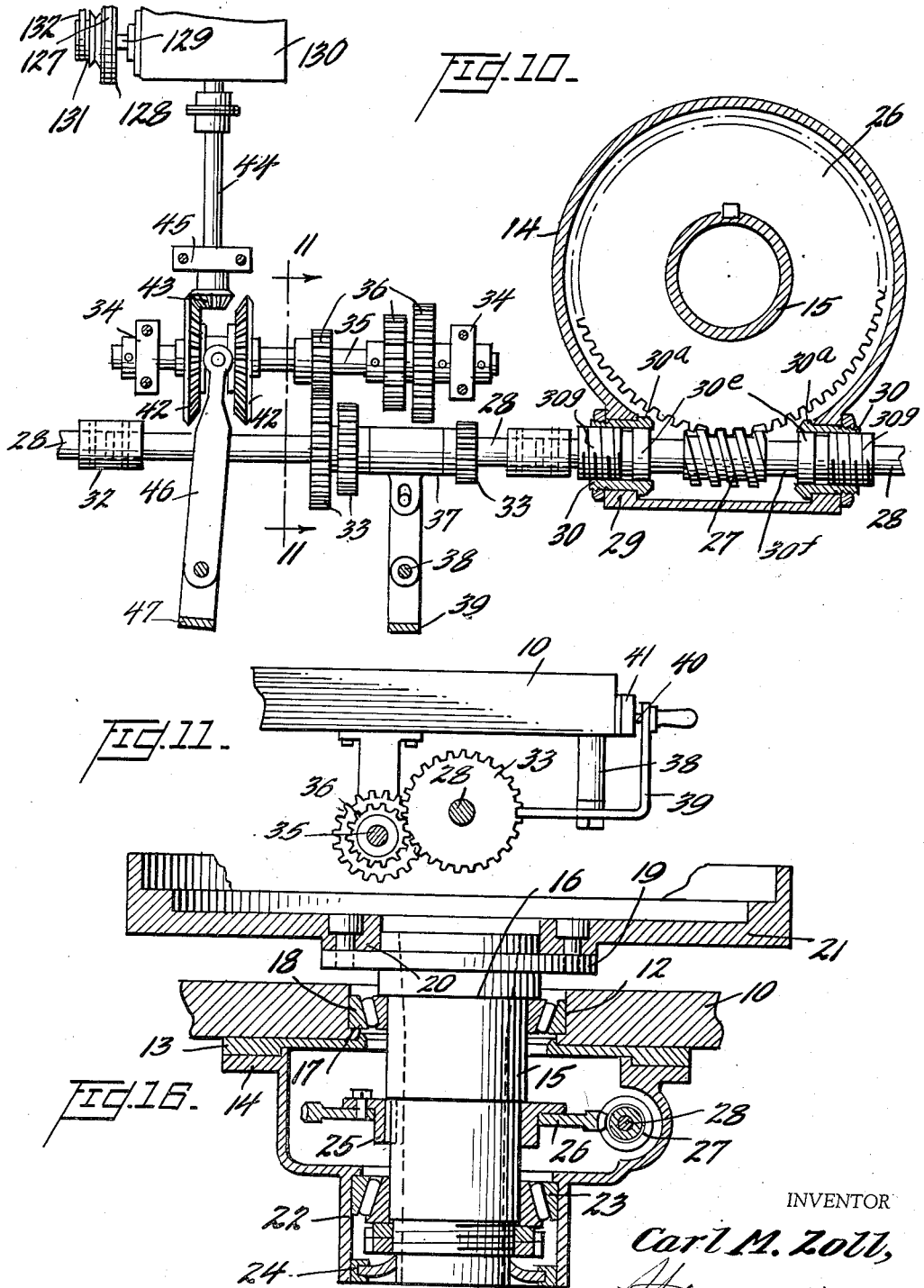

Dec. 8, 1953  C. M. ZOLL  2,661,661
DUPLICATING MILLING MACHINE
Filed Sept. 21, 1951  7 Sheets-Sheet 6
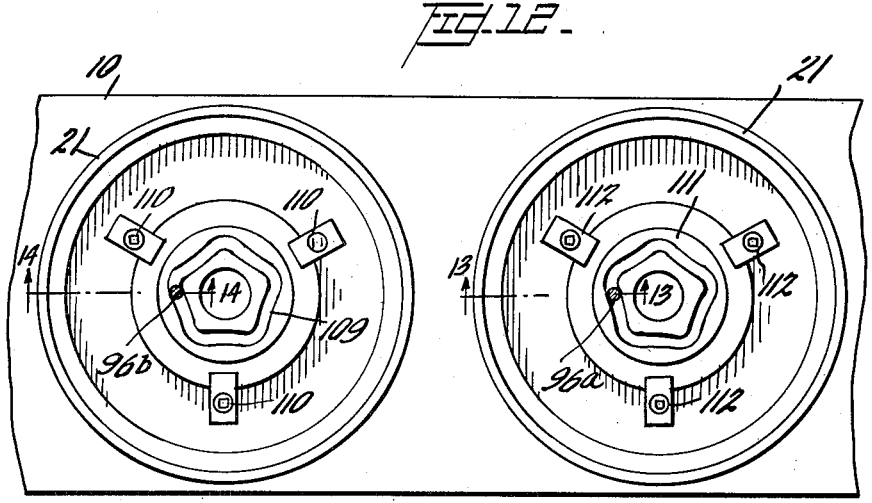
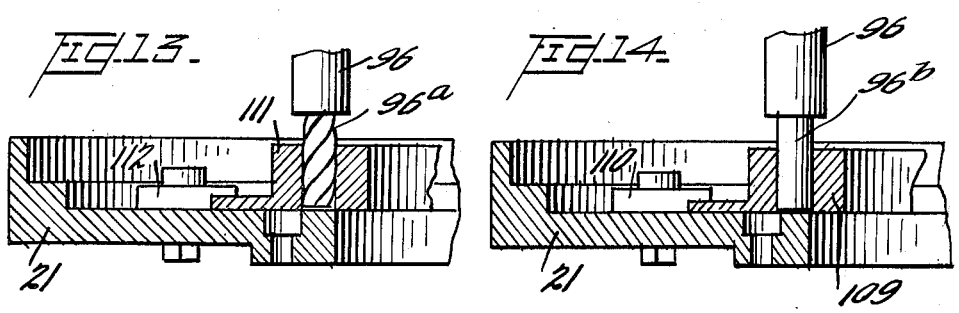
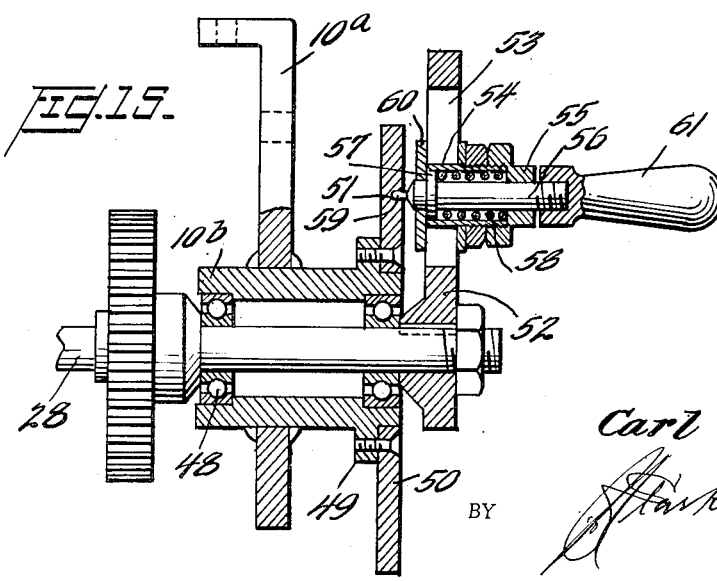
INVENTOR
Carl M. Zoll,
BY
ATTORNEY Dec. 8, 1953           C. M. ZOLL           2,661,661
DUPLICATING MILLING MACHINE
Filed Sept. 21, 1951                                       7 Sheets-Sheet 7
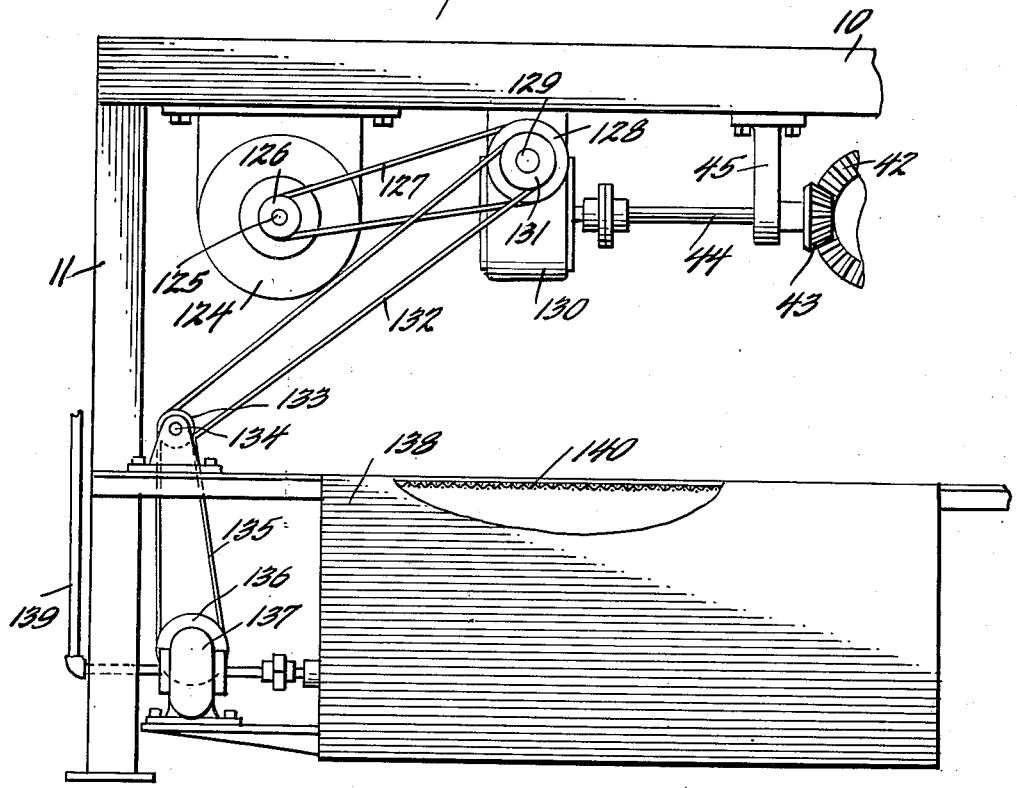
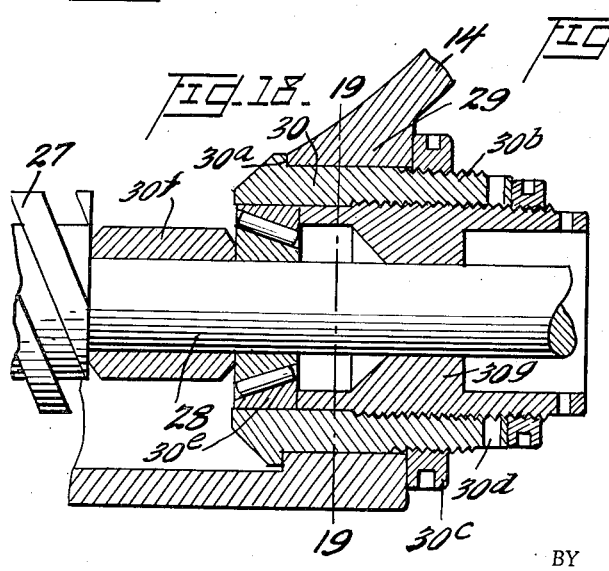
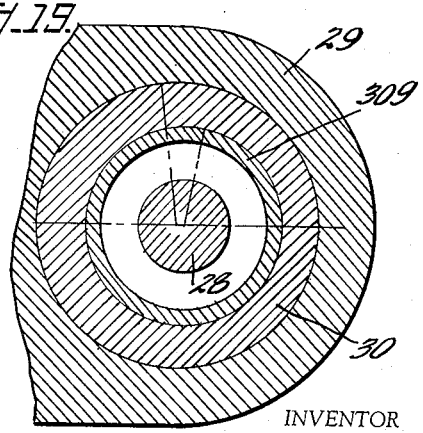
INVENTOR
Carl M. Zoll
BY
ATTORNEY Patented Dec. 8, 1953

2,661,661

UNITED STATES PATENT OFFICE 2,661,661

DUPLICATING MILLING MACHINE

Carl Michael Zoll, New Orleans, La., assignor to Hydro Power, Inc., New Orleans, La.

Application September 21, 1951, Serial No. 247,657

9 Claims. (Cl. 90—13.3)

This invention relates to contour duplicating machines and has special reference for a machine for duplicating such contours as exists in cams and like.

Many attempts have been made to produce accurate duplicates of contours by milling a blank, the action of which is controlled by a pattern, but such machines as now exist have been found to lack the accuracy required in most cases, the duplicate often varying from the pattern so that a tolerance of not less than .008 is thought to be sufficient. In the present machine forming the subject matter of this application, actual tests on the machine show that the duplicate produced is correct to the pattern with a tolerance of .0005.

One object of the invention therefore is to provide a contour duplicating machine wherein the construction is such that the tolerance between the pattern and the duplicate shall be less than .001.

A second important object of the invention is to provide a machine of this character wherein a pattern and a blank are caused to revolve in unison, a feeler engaging the pattern and a milling cutter acting on the blank.

A third important object of the invention is to provide a machine of this character having a feeler support and a milling cutter support so carried and arranged as to prevent tilting or give of any kind between the movement of the feeler and the movement of the cutter.

The fourth important object of the invention is to provide a machine of this character equipped with a standard indexing plate so that when it is desired to form a cam having a series of successive equal portions each embodying a high point and a low point, a pattern may be utilized embodying only one such high and low point section, the indexing plate being set to cause accurate repetition of the pattern about the blank.

The fifth important object of the invention is to provide a machine of this character having means for accurately adjusting and maintaining distance between the axis of the cutter and the pattern contacting point of the feeler.

A sixth object of the invention is to provide a machine of this character wherein the pattern or templet and the blank may be readily removed and replaced and when held in working positions will be immovably retained in proper axial alignment.

With the above and other objects in view, as will be hereinafter apparent, the invention consists in general of certain novel details of construction and combinations of parts hereinafter fully described, illustrated in the accompanying drawings and particularly claimed.

In the accompanying drawings, like characters of reference indicate like parts in the several views, and:

Fig. 2 is a plan view thereof.

Fig. 3 is an end view thereof taken from the right side of Fig. 2.

Fig. 4 is a fragmentary section on the line 4—4 of Fig. 2.

Fig. 5 is a section on the line 5—5 of Fig. 4.

Fig. 6 is a detailed section on the line 6—6 of Fig. 4.

Fig. 7 is a detailed sectional view showing certain clamping means used herewith.

Fig. 8 is a detailed section showing the manner of firmly supporting certain blocks carrying the shafts of the feeler and cutting tool, the support being provided with roller bearings to render adjustment easy when necessary.

Fig. 9 is a detailed section on the line 9—9 of Fig. 8.

Fig. 10 is a view showing certain reverse and speed changing gearing used herewith.

Fig. 11 is a detailed section on the line 11—11 of Fig. 10.

Fig. 12 is a detailed section on the line 12—12 of Fig. 1.

Fig. 13 is a detailed section on the line 13—13 of Fig. 12 and showing the milling cutter operating on a portion of a blank.

Fig. 14 is a section on the line 14—14 of Fig. 12 showing a portion of the pattern or templet and the feeler or guide.

Fig. 15 is an enlarged sectional view showing the indexing arrangement used in the invention.

Fig. 16 is a section on the line 16—16 of Fig. 1.

Fig. 17 is a fragmentary section on the line 17—17 of Fig. 2.

Fig. 18 is an enlarged detail section on the line 18—18 of Fig. 1.

Fig. 19 is a section on the line 19—19 of Fig. 18.

Fig. 20 is an enlarged detail section of the left hand portion of Fig. 4.

Fig. 21 is a fragmentary elevation showing fluid circulating means for use in this invention.

Figure 1:
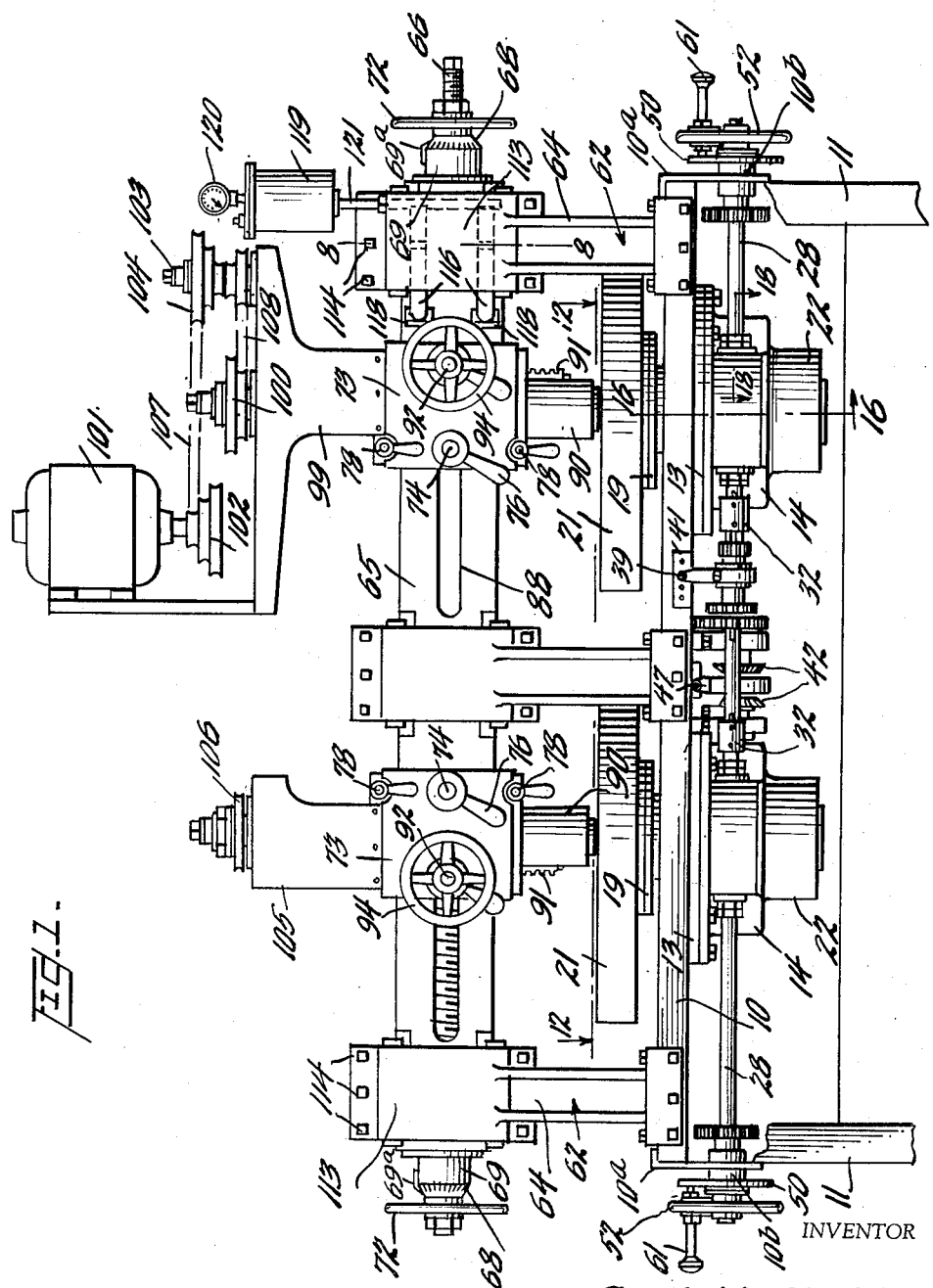
Fig. 1 is a front elevation of a machine constructed in accordance with this invention.

In the construction of the invention as herein embodied there is provided a main table or base 10 supported on legs 11. This table is of elongated rectangular form and has an opening 12 adjacent each end. Below each of the openings 12 is secured a plate 13 to which is suitably attached a housing 14. Extending downwardly through each opening 12 is a bearing sleeve 15 having a shoulder 16 adjacent its upper end. The opening 12 is likewise provided at its lower end with a shoulder 17 and between the shoulder 17 and the shoulder 16 there is fitted a taper roller bearing indicated generally at 18. At the upper end of the sleeve 15 is a flange 19 to which is secured a spacer plate 20. Integral with each of the spacer plates there is a turntable 21 and means are provided to cause simultaneous rotation of the two turntables as will be presently described. The lower end of the housing has a sleeve 22 extending downwardly therefrom and between the wall of this sleeve 22 and the sleeve 15 there is fitted a tapered roller bearing 23. A suitable packing closure 24 fits around the lower end of the sleeve 15 and engages the sleeve 22, thus closing the housing so that packing grease placed therein will not escape downwardly.

Keyed on the sleeve 15 is a collar 25 and carried by this collar is a worm gear 26 which is engaged by a worm 27 fixed on a shaft 28. Each housing 14 is provided with a pair of alined bearing bosses 29 in which are rotatably fitted the sleeves 30 each having a flange 30a on one end engaging against the inner face of the bearing boss 29 and having an externally threaded outer end 30b projecting from the boss. On end 30b is screwed a nut 30c which acts with the flange 30a to secure the sleeve against rotation in the boss. The outer end 30b is threaded internally also and is provided with spanner openings 30d. The inner end of the sleeve 30 is eccentrically bored to provide a cylindrical opening in which is fitted a roller bearing 30e forming one of the bearings supporting the shaft 28. A spacer sleeve 30f is fitted on the shaft 28 between the worm 27 which is integrally formed on the shaft 28 and the roller bearing 30e. A bushing 30g is screwed into the sleeve 30 and bears against the roller bearing 30f to hold the latter in place. This arrangement, best shown in Figs. 18 and 19, affords exact meshing and longitudinal adjustment of the worms with the worm wheels. The two shafts 28 are in alinement and their proximal ends are connected by a suitable coupling 32, thus causing the two shaft sections to revolve in unison.

In order to provide means for driving the shaft 28 at selected speed on one section of said shaft there is keyed a set of graduated gears 33. Suitably supported in bearings 34 is a jack-shaft 35 and on this jack-shaft there is fixed a set of graduated gears 36 so positioned that by shifting the gears 33 longitudinally of the shaft 28, the gears 33 may be selectively engaged with the gears 36, the arrangement being that common in most change gear devices. In order to move the gears when desired, there is provided a shipper 37 pivoted at 38 and having an operating handle 39 carrying a stop member 40 for engagement with a rack bar 41 having suitable openings to receive the stop member 40 in accordance with which the gears 33 and 36 are to be engaged. In order to drive the jack-shaft 35 there is splined in this shaft a pair of confronting bevel gears 42 adapted to be moved into selective engagement with a driving gear 43 fixed on a vertical shaft 44 journaled as at 45. This gear 43 when engaged by one of the gears 42 will cause rotation of the shaft 35 in one direction while, when engaged by the other gear 42, will cause rotation in the opposite direction. In order to control the engagement of the gears 42 with the gear 43, there is provided a shipper 46 having a handle 47 in a manner similar to the arrangement of the handle 39.

Secured to each end of the base 10 and depending therefrom is a bracket 10a carrying a bearing housing 10b which carries ball bearings 48, wherein is supported the outer end of the shaft 28. Surrounding the outer end of the housing 47 is a rib 49 whereto is bolted a standard indexing plate 50 provided with the usual spaced holes 51. Keyed on the shaft 28 is an indexing arm 52 having an opening 53, in its upper end. Fitted in the opening 53 is a sleeve 54, the outer end of which is circumferentially threaded so that a recessed nut 55 may secure the sleeve in position in the arm 52. Slidable through the nut 55 is a plunger 56 having a collar 57 fitting in the inner end of the sleeve. Between this collar and the nut 55 is a coiled compression spring 58 which urges the plunger inwardly. The inner end of the plunger projects from the sleeve 54 and is formed as a pin 59 to selectively fit in one of the openings 51. At 60 is a plate immovably secured on the sleeve 54. The outer end of the plunger 56 has screwed thereon an operating handle 61. By means of this arrangement, when the handle is pulled to move the plunger 58 outwardly, the pin 59 releases from the indexing plate and may be shifted to engage at another one of the openings 51. Of course, when the pin is thus engaged, the handle 61 being released, the handle may be used to rotate the arm 52 and thus to effect rotation of the shaft 28 to any desired degree.

Straddling each end of the base 10 and upstanding therefrom is a yoke 62 and centrally of the length of the base there is another yoke 63. Each yoke has a pair of spaced guide members or supporting legs 64, between which is fitted a beam 65. Through each beam end extends an adjusting screw 66 which passes through a nut 67, on which is supported a graduated dial 68 the periphery of which rests on the outer end of a sleeve 69 secured to the beam 65 by bolts 70, suitable thrust bearings 71 being held between the nut and the sleeve. On the nut is fixed an operating wheel 72. The graduations of the disk on dial 68 are such that an adjustment of .001 inch may be made for the protraction and retraction of the screw 66. On the sleeve 69 is secured a pointer or index finger 69a. The dial 68 is rotatable on the nut 67 for adjustment relative to the finger 69a and is secured in adjusted position by means of the thumb screw 68a. Slidably mounted on the beam 65 is a carriage member including a pair of jaws 73 held against the sides of the beam by means of a screw 74 which extends through one jaw and enters a nut 75 projecting inwardly from the opposite jaw. The screw 74 is provided with an operating handle 76 so that no necessity arises for using a wrench or other tool to clamp the jaws properly together. Between the sides of the beam 65 is mounted a pair of blocks 79 having ribs 77 which engage the upper and lower edges of the beam sides as shown in Fig. 7. To the outer faces of the beam are bolted bearing plates 80 and the yokes have fitted therein cooperating bearing races 81 arranged at each corner of the beam. Between the races 81 and the beveled edges of the plates 80, which thus form opposed races, there are fitted tapered bearings 82. By this arrangement each carriage is firmly mounted on the beam so that while it may slide along the beam as supported by the bearings, it will be held firmly from any tilting or shaking relative to the beam. The blocks 79 are secured in proper spaced relation by handled bolts 78.

Fixed to the carriage is a socket plate 83 and the screw 66 enters this socket plate and is held by a tapered pin 84. By rotating the nut 67 each carriage may be moved forwardly and rearwardly on the beam. The beam 65 is provided with a transversely extending longitudinal slot 88 through which the screw 74 passes so that upon tightening the screw 74, the carriage will be clamped immovably on the beam while, when the screw is loosened, the carriage is free to slide on the beam. Blocks 79 are formed to provide two grooved members, the grooves being indicated at 89 and, as shown in Fig. 6, confronting each other. Slidably mounted in the opening formed by the grooves 89 is a cylindrical bearing member 90 at one side of which is fixed a rack 91. Extending from one of the sections of the block is a rotatable shaft 92 carrying a gear 93, which meshes with the rack 91. An adjusting wheel 94 is fixed on the shaft 92 and clamp means 95 draw the blocks 79 to grip on the bearing 90 thus holding it in adjusted position when the same has been attained by the action of the gear on the rack. Extending through an opening in the bearing sleeve 90 is a spindle 96 which is supported in the bearing sleeve by suitable tapered roller bearings 97. Also packing 98 is provided to fit around the spindle 96 and in the bearing sleeve 90. Thus lubricant provided for the spindle will be prevented from escaping improperly.

On the lower end of one of these spindles there is fitted a suitable milling cutter 96a while on the lower end of the other spindle is fitted a feeler or follower 96b. The carriage for the spindle to which the milling cutter is attached is provided with a T-shaped extension 99, through which this spindle passes upwardly to carry graduated belt pulleys 100. On one arm of the extension 99 is supported a motor 101 on the shaft of which there is provided graduated belt pulleys 102. Carried by the other arm of the extension 99 is a jack-shaft 103 carrying belt pulleys 104. Similarly, the other carriage is provided with an upward extension 105, the spindle of this carriage extending upwardly through the extension. This spindle also is provided with a belt pulley 106. The jack-shaft 103 has its pulleys so arranged that they may be selectively connected to the pulleys 102 by a belt 107 and to the pulleys 100 by a belt 108. Also, if desired the pulleys 100 and the pulley 106 may be connected by a suitable belt.

In the operation of the device, there is provided on the left hand turntable 21 a templet or pattern 109 which is secured in position by clamps or holding down bolts 110. On the other turntable there is provided a blank or work piece 111 likewise secured fixedly on its table by holding down bolts and straps as indicated at 112.

In order to provide means for keeping a constant pressure of the feeler on the templet the arrangement best shown in Figs. 3 and 17 is provided. It is to be seen that each yoke is formed in two halves, a head member 113 being carried on the heads of the yoke legs. These head members are secured firmly together by means of bolts 114. At the right hand end of the machine each of the head members is provided with a pair of horizontally disposed bores 115, these bores constituting cylinder portions. In each of the bores is fitted a plunger 116 provided with a suitable packing ring 117. The bores or cylinders 115 open toward the longitudinal center of the machine and engage against angle stops 118. Mounted above the bore provided head is a pressure cylinder 119 whereon is located a gage 120. This pressure cylinder communicates by branch pipes 121 with the upper ends of manifold passages 122 formed in the head parts 113. Fluid under pressure is provided to the cylinder through a plugged opening 123. This arrangement provides for four plungers equally distributed on both sides of the beam and with the desired pressure shown in the gage 120, the beam will be uniformly urged toward the left of Fig. 2 so that the feeler will engage with a constant pressure the templet as it revolves.

In order to provide necessary lubricating means and also to drive the shaft 44 there is, as shown in Fig. 21, a motor 124. The shaft 125 of this motor has a pulley 126 fixed thereon and this pulley is connected by a belt 127 with a pulley 128 fixed on the shaft 129 of a reduction gearing of suitable type, the casing of which is shown at 130. On the shaft 129 is fixed a second pulley 131 which is connected by a belt 132 with a pulley 133 carried on a shaft 134. The pulley 133 is a double pulley, this is to say it is arranged to carry a pair of belts side by side. Also carried by this pulley 133 is a belt 135 which connects the pulley 133 to a pulley 136 driving a pump 137. This pump receives lubricating or cooling fluid from a tank 138 and delivers lubricant through a suitable pipe arrangement 139 to desired portions of the machine. The tank 138 is arranged beneath the cutter spindle of the machine and is provided with a wire mesh top 140 so that fluid passing downward through the cutter spindle will be returned to the tank 138.

By the manipulation of the wheels 72, the carriages are adjusted in position so that the feeler will engage the templet and the milling cutter will be in position to mill the blank. It is to be noted that the arrangement shown in Fig. 15 is such that the relative positions of the feeler and the milling cutter will be such that the movement of the milling cutter inwardly and outwardly of the blank will exactly follow the movement of the feeler inwardly and outwardly against the templet.

What is claimed is:

1. In a duplicating milling machine, a base, a spaced pair of turn-tables rotatably supported on said base, driving means for synchronously rotating said turn-tables, a follower associated with one of said turn-tables, a cutter associated with the other turn-table, upstanding guide yokes mounted on said base, a beam slidably supported in said yokes for longitudinal movement over said base, carriages carried by said beam above said turn-tables and respectively supporting said follower and said cutter, and hydraulic pressure means constantly urging the beam in one direction.

2. In a duplicating milling machine, a base, a spaced pair of turn-tables rotatably supported on said base, driving means for synchronously rotating said turn-tables, a follower associated with one of said turn-tables, upstanding guide yokes mounted on said base, a beam slidably supported in said yokes for longitudinal movement over said base, spaced carriages on said beam one of which supports said follower, said carriages being slidable along said beam, nuts rotatably carried by the ends of said beam, and adjusting screws tending through said nuts and fixed to said carriages and hydraulic pressure means constantly urging the beam in one direction.

3. In a duplicating milling machine, a base, a spaced pair of turn-tables rotatably supported on said base, driving means for synchronously rotating said turn-tables, a follower associated with one of said turn-tables, a cutter associated with the other turn-table, upstanding guide yokes mounted on said base, a beam slidably supported in said yokes for longitudinal movement over said base, and carriages carried by said beam above said turn-tables, vertical spindles extending through said carriages and respectively supporting said feeler and said cutter, and drive means for said cutter on the carriage carrying the cutter supporting spindle, and hydraulic pressure means constantly urging the beam in one direction.

4. In a duplicating milling machine, a base, a spaced pair of turn-tables rotatably supported on said base, driving means for synchronously rotating said turn-tables, a follower associated with one of said turn-tables, a cutter associated with the other turn-table, upstanding guide yokes mounted on said base, a beam slidably supported in said yokes for longitudinal movement over said base, and carriages carried by said beam above said turn-tables, vertical spindles extending through said carriages and respectively supporting said follower and said cutter, and means for vertically adjusting said spindles in said carriages.

5. In a duplicating milling machine, a base, a spaced pair of turn-tables rotatably supported on said base, driving means for synchronously rotating said turn-tables, a follower associated with one of said turn-tables, a cutter associated with the other turn-table, upstanding guide yokes mounted on said base, a beam slidably supported in said yokes for longitudinal movement over said base, and carriages carried by said beam above said turn-tables, vertical spindles extending through said carriages and respectively supporting said feeler and said cutter, and means for vertically adjusting said spindles in said carriages, including bearings mounted for vertical movement in said carriages and supporting said spindles, racks fixed on said bearings, gears rotatably mounted in the carriages and meshing with said racks, and manual means for rotating said gears.

6. In a duplicating milling machine, a base, a spaced pair of turn-tables rotatably supported on said base, driving means for synchronously rotating said turn-tables, a follower associated with one of said turn-tables, a cutter associated with the other turn-table, said driving means including a pair of housings mounted beneath said base below the turn-tables, vertical shafts journalled in said housings and attached to said turn-tables, worm gears fixed on said shafts, worms in said housings meshing with said worm gears, and a horizontal shaft carrying said worms, upstanding guide yokes mounted on said base, a beam slidably supported in said yokes for longitudinal movement over said base, carriages carried by said beam above said turn-tables and respectively supporting said follower and said cutter, and means for independently adjusting the carriages along the beam.

7. In a duplicating milling machine, a base, a spaced pair of turn-tables rotatably supported on said base, driving means for synchronously rotating said turn-tables, a follower associated with one of said turn-tables, a cutter associated with the other turn-table, said driving means including a pair of housings mounted beneath said base below the turn-tables, vertical shafts journalled in said housings and attached to said turn-tables, worm gears fixed on said shafts, worms in said housings meshing with said worm gears, and a horizontal shaft carrying said worms, upstanding guide yokes mounted on said base, a beam slidably supported in said yokes for longitudinal movement over said base, and carriages carried by said beam above said turn-tables and respectively supporting said follower and said cutter, means for independently adjusting the carriages along the beam, and means for vertically adjusting said spindles in said carriages.

8. In a duplicating milling machine, a base, a spaced pair of turn-tables rotatably supported on said base, driving means for synchronously rotating said turn-tables, a follower associated with one of said turn-tables, a cutter associated with the other turn-table, said driving means including a pair of housings mounted beneath said base below the turn-tables, vertical shafts journalled in said housings and attached to said turn-tables, worm gears fixed on said shafts, worms in said housings meshing with said worm gears, and a horizontal shaft carrying said worms, upstanding guide yokes mounted on said base, a beam slidably supported in said yokes for longitudinal movement over said base, and carriages carried by said beam above said turn-tables and respectively supporting said follower and said cutter, including bearings mounted for vertical movement in said carriages and supporting said spindles, racks fixed on said bearings, gears rotatably mounted in the carriages and meshing with said racks, and manual means for rotating said gears.

9. In a duplicating milling machine, a base, a spaced pair of turn-tables rotatably supported on said base, driving means for synchronously rotating said turn-tables, a follower associated with one of said turn-tables, a cutter associated with the other turn-table, upstanding guide yokes mounted on said base, a beam slidably supported in said yokes for longitudinal movement over said base, and carriages carried by said beam above said turn-tables and respectively supporting said follower and said cutter, brackets fixed on said beam, a pair of cylinders fixed adjacent said brackets, plungers in said cylinders acting on said brackets, and an equalizing cylinder having pipe connection with the pair of cylinders.

CARL MICHAEL ZOLL.

References Cited in the file of this patent

UNITED STATES PATENTS

| Number | Name | Date |
| --- | --- | --- |
| 71,568 | Basse | Dec. 3, 1867 |
| 731,870 | Echols | June 23, 1903 |
| 856,306 | Smith | June 11, 1907 |
| 895,383 | Mangels | Aug. 4, 1908 |
| 1,024,516 | Lund | Apr. 30, 1912 |
| 1,597,741 | Topham | Aug. 31, 1926 |
| 1,770,458 | Castonguay | July 15, 1930 |
| 1,796,079 | Boyle | Mar. 10, 1931 |
| 1,844,323 | Parten | Feb. 9, 1932 |
| 2,137,462 | Romaine | Nov. 22, 1938 |
| 2,228,583 | Parsons | Jan. 14, 1941 |
| 2,330,566 | Edmonds et al. | Sept. 28, 1943 |

FOREIGN PATENTS

| Number | Country | Date |
| --- | --- | --- |
| 453,965 | Great Britain | Sept. 22, 1936 |